United States Patent [19]
Makino et al.

[11] Patent Number: 4,514,084
[45] Date of Patent: Apr. 30, 1985

[54] DISTANCE MEASURING APPARATUS

[75] Inventors: Hiroshi Makino, Hirakata; Masaru Higuchi, Toyonaka; Kazuou Murata, Settsu, all of Japan

[73] Assignee: West Electric Company, Ltd., Osaka, Japan

[21] Appl. No.: 352,066

[22] Filed: Feb. 24, 1982

[30] Foreign Application Priority Data

Mar. 3, 1981 [JP] Japan .................. 56-30736

[51] Int. Cl.³ ............................. G01C 3/08
[52] U.S. Cl. ........................... 356/4; 356/141
[58] Field of Search ............... 356/1, 4, 5, 141, 152

[56] References Cited

U.S. PATENT DOCUMENTS

| | | |
|---|---|---|
| 1,866,581 | 7/1932 | Simjian . |
| 3,512,888 | 5/1970 | Humphrey .................. 356/4 |
| 3,617,128 | 11/1971 | Harvey ...................... 356/4 |
| 3,746,454 | 7/1973 | Pace et al. ................. 356/152 |
| 3,792,928 | 2/1974 | Poilleux ..................... 356/4 |
| 3,953,131 | 4/1976 | Britz ......................... 356/141 |
| 4,006,988 | 2/1977 | Tamm ........................ 356/1 |
| 4,040,738 | 8/1977 | Wagner ...................... 356/1 |
| 4,106,872 | 8/1978 | Soderstrom ................ 356/5 |
| 4,257,705 | 3/1981 | Hosoe et al. .............. 356/1 |
| 4,314,760 | 2/1982 | Hodge et al. ............. 356/4 |

FOREIGN PATENT DOCUMENTS 1196380 8/1965 Fed. Rep. of Germany .......... 356/4

Primary Examiner—S. C. Buczinski
Attorney, Agent, or Firm—Cushman, Darby & Cushman

[57] ABSTRACT

In a distance measuring apparatus in accordance with the present invention, a light beam of a wide solid angle is projected on a photographic object by means of a strobo light source, and reflected rays are received by a photoelectric device array which has a predetermined number of photoelectric devices each with narrow directivity which are comparable to solid angles necessary to see the object from the photoelectric devices disposed with their optical axes at predetermined angular pitches. When the output of a photoelectric device, which is issuing maximum amplitude output, is selected by means of a maximum value detector circuit, and a distance signal is discriminated from background noises such as sun light or electric illumination light by passing through a differentiating circuit, and then being processed by a function circuit and fed to a lens driving system or indicator.

1 Claim, 12 Drawing Figures

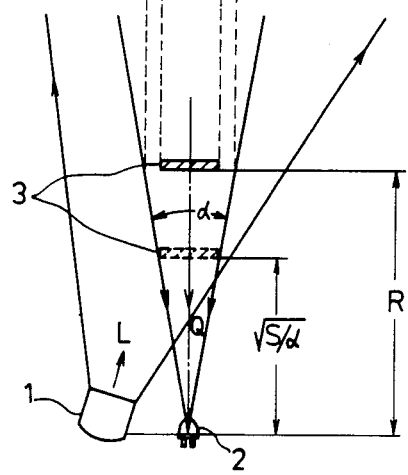

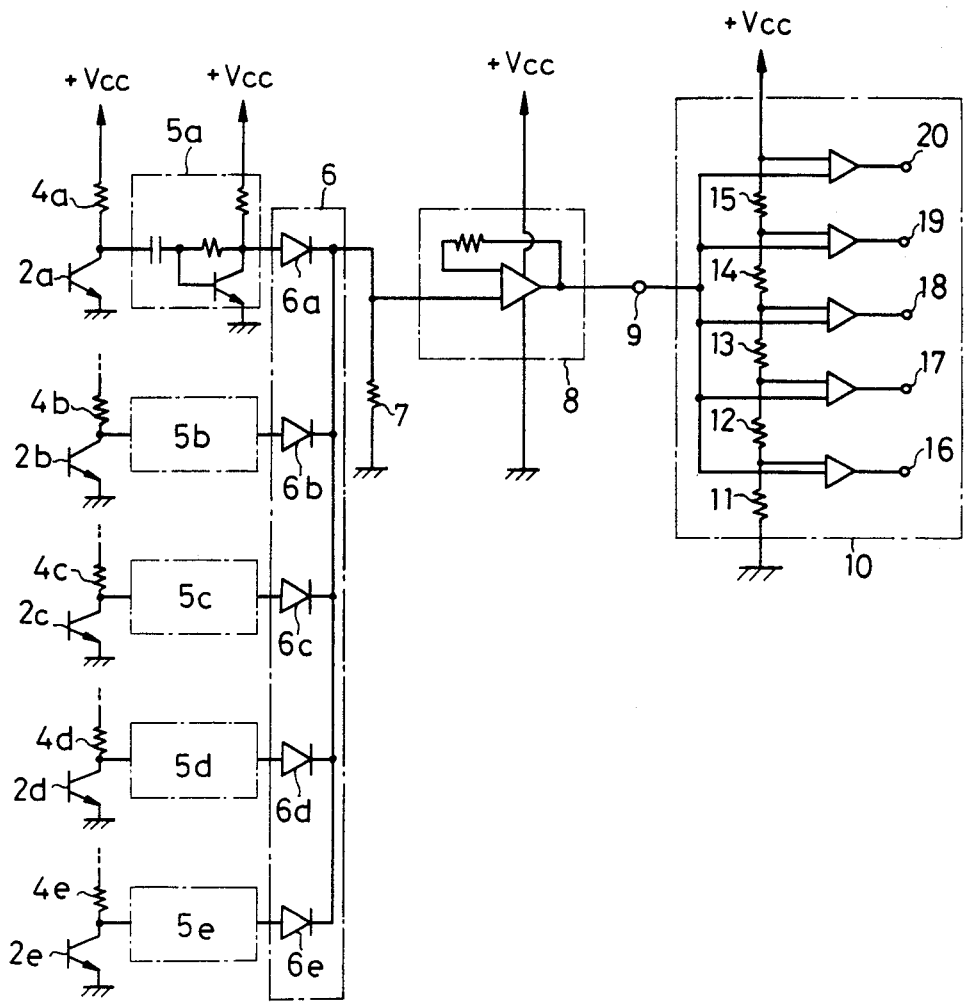

DISTANCE MEASURING APPARATUS

BACKGROUND OF THE INVENTION

1. Field of the Invention

The present invention relates to an improvement of a distance measuring apparatus whereby distance of a photographic object can be measured accurately irrespective of its visual angle from the apparatus.

2. Prior Art

A distance measuring apparatus which projects light of a considerably wide solid angle towards an object, receives reflected light by a photoelectric device having a narrow directivity and outputs a distance signal as a function signal of the output signal of the photoelectric device which output signal varies responding to distance to the object, is known by the patent specification of the U.S. Pat. No. 1,866,581.

In the above-mentioned distance measuring apparatus, in order to avoid inaccurate measurement it is necessary to select the directivity of the photoelectric device sufficiently narrow with respect to the visual angle of the measured object from the photoelectric device. The reason of the necessity of the narrow directivity of the photoelectric device is explained referring to FIG. 1, wherein a light source 1 projects light of a considerably wide solid angle, and a photoelectric device 2 such as a phototransistor of a very narrow directivity receives the light reflected by the object 3. Now provided that the light source 1 projects light of the flux density L per unit solid angle and the photoelectric device 2 has a directivity of solid angle $\alpha$, and its optical axis is disposed towards the center of the object 3 of a disc of an area S and of a reflection index m, then, when the object 3 is disposed at the distance of $$R_1 = \sqrt{\frac{S}{\alpha}},$$

the object 3 makes a solid angle which is equal to that of the directivity angle $\alpha$ of the photoelectric element 2. In other words, the area S of the object is equal to such area at the distance R that reflected light from which area induces output signal to the photoelectric device 2.

(i) For the distance R in a shorter range of $$R \leq \sqrt{\frac{S}{\alpha}}, \qquad (1)$$

the intensity of light Q received by the photoelectric device 2 is proportional to the illumination $mL/R^2$ of the object. By considering that the light flux density L is constant for a short time considered, the following formula holds:

$$Q \propto \frac{m}{R^2}. \qquad (2)$$

In the above-mentioned system, when the electric circuit including the photoelectric device is designed to issue an output signal Y of the value $Y \alpha k \sqrt{1/Q}$, then the following equation holds:

$$Y = \frac{k}{\sqrt{m}} \cdot R. \qquad (3)$$

In the actual system, as is shown in the equation (3), the output signal Y is proportional to the distance R and inversely proportional to the square root of the reflection index m. Since the output signal Y is inversely proportional to the square root of m, variation of m only slightly affects the output value Y. For example, when k is selected as $k = \sqrt{0.4}$, the output Y changes as follows responding to three values of m:

when $m = 0.2$, $Y = \frac{\sqrt{0.2}}{\sqrt{0.4}} \cdot R = 0.7R$ when $m = 0.4$, $Y = \frac{\sqrt{0.4}}{\sqrt{0.4}} \cdot R = 1R$ and when $m = 0.8$, $Y = \frac{\sqrt{0.8}}{\sqrt{0.4}} \cdot R = 1.4R.$ When the actual distance is 1 m, then the above-mentioned three outputs make a distance meter indicate in a range of 0.7–1.4 m, and for a practical distance meter for usual photographing, such variation is permitted.

(ii) For the distance R in a longer range of $$R > \sqrt{\frac{S}{\alpha}}, \qquad (4)$$

the intensity of light received by the photoelectric device 2 is proportional to the illumination $m/R^2$, and at the same time to $S/\alpha R^2$, which is the ratio of area of the object 3 to such area at the distance R that reflected light from which area induces output signal to the photoelectric device 2. Accordingly, for the intensity of light Q, the following formula holds:

$$Q \propto \frac{m}{R^2} \cdot \frac{S}{\alpha R^2}. \qquad (5)$$

Then, when this light input is converted into an electric signal Y by the same circuit as the foregoing case, which is designed to issue an output signal Y of the value $Y \alpha k \sqrt{1/Q}$, then the following equation holds:

$$Y = \frac{k}{\sqrt{m}} \cdot \sqrt{\frac{\alpha R^2}{S}} \cdot R. \qquad (6)$$

In this case, when k is selected as $k = \sqrt{0.4}$, the output Y changes as follows responding to the values of m:

when $m = 0.2$, $Y = 0.7 \sqrt{\frac{\alpha R^2}{S}} \cdot R$ when $m = 0.4$, $Y = \sqrt{\frac{\alpha R^2}{S}} \cdot R$ -continued when $m = 0.8$, $Y = 1.4 \cdot \sqrt{\frac{\alpha R^2}{S}} \cdot R$.

This means that, on top of the variation range of 0.7R to 1.4R in the foregoing case (i), a further factor $\sqrt{\alpha R^2/S}$ is added. The value of the factor $\sqrt{\alpha R^2/S}$ at the distance R is about 1.6, and therefore, the output signal varies as follows responding to three values of m:

| | |
|---|---|
| when m = 0.2, | Y = 0.7 × 1.6R = 1.2R |
| when m = 0.4, | Y = 1.0 × 1.6R = 1.6R and |
| when m = 0.8, | Y = 1.4 × 1.6R = 2.2R. |

When the actual distance is 1 m, the indication of the measured distance ranges from 1.12 m to 2.2 m, and the latter indication is not tolerable any more.

As has been explained, for the distance R of the range $$R > \sqrt{\frac{S}{\alpha}},$$

the indication of the distance may become much different from the actual distance. In other words, in order to avoid such discrepancy, the condition of the formula $R < \sqrt{S/\alpha}$ must be fulfilled by, for example, selecting the solid angle $\alpha$ narrow. Hereupon, another trouble arises when the solid angle $\alpha$ of the directivity of photoelectric device is selected narrow. The handling of the distance measuring apparatus becomes very difficult since the optical axis of the photoelectric device must be very accurately directed towards the object, and use of the apparatus for an easy-handling camera becomes impractical.

Another problem of the distance measuring apparatus is the undesirable effect of background noise of sunlight and illuminating light to the photoelectric device, and the effect of such background noise should be eliminated as much as possible.

SUMMARY OF THE INVENTION

The present invention to provides a distance measuring apparatus which projects a light of a solid angle sufficiently larger than that of the object seen from the apparatus, receives by a photoelectric device a light reflected by the object, and produces a distance signal from the electric output signal from the photoelectric device, wherein the apparatus is improved to produce accurate distance signals even for long distances which hitherto has been liable to be measured inaccurately.

Accurate measurement can be attained by the apparatus in accordance with the present invention in such a manner that a light beam of a wide solid angle is projected on the photographic object by means of a strobo light source, and reflected rays are received by a photoelectric device array which has a predetermined number of photoelectric devices each with such narrow directivity that which is comparable to solid angles to see the object from the photoelectric devices disposed with their optical axes at predetermined angular pitches. Then the output of a photoelectric device, which is issuing maximum amplitude output, is selected by means of maximum value detector circuit, and the distance signal is discriminated from background noises such as sun light or electric illumination light by passing through a differentiating circuit, and then processed by a function circuit and fed to a lens driving system or indicator.

BRIEF EXPLANATION OF THE DRAWING

FIG. 1(a) is a schematical plan view of a conventional distance measuring apparatus using a light projection on measuring object and reflected light reception by a photoelectric device.

FIG. 1(b) is a front view showing relation between the areas of the object 3 and a circle of such an area that light reflected from which area induces output signal to the photoelectric device 2, both at a distance farther than $R = \sqrt{S/\alpha}$.

FIG. 3 is a circuit diagram of a principal part of the electric circuit of the embodiment.

DESCRIPTION OF THE PREFERRED EMBODIMENT

Figure 2A:
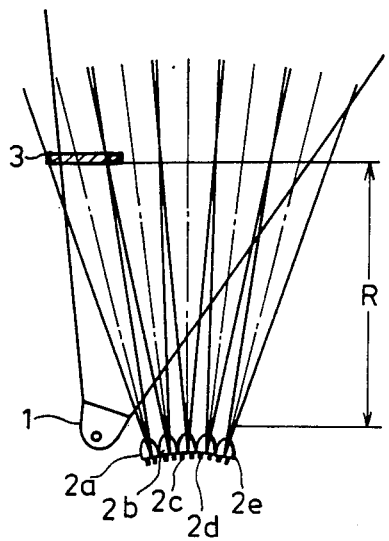
FIG. 2(a) is a plan view of the construction of an embodiment of the present invention.

A configuration of a preferred embodiment of the present invention is shown in FIG. 2(a), which is a plan view of the apparatus.

A light source 1 is a strobo light using for example a xenon lamp which is lit by electric energy stored in a capacitor, and when ignited by application of a pulse voltage to a trigger electrode a gas discharge takes place in the light source thereby lighting it to emit a very high intensity light for a very short time. A predetermined number of photoelectric devices, for example, phototransistors, 2a, 2b, 2c, 2d, 2e . . . , each having relatively sharp directivity, i.e., narrow solid angle of sensitivity, are disposed with their optical axis at predetermined angular pitches.

Figure 2B:
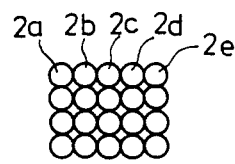
FIG. 2(b) is a front view of a photoelectric device array of FIG. 2(a).

The photoelectric devices 2a, 2b . . . are preferably disposed to form both in horizontal rows and vertical columns as shown in FIG. 2(b), and in both the rows and columns the photoelectric devices should be disposed with the predetermined angular pitches.

When an object 3 is at a deflected position as shown in FIG. 2(a), the sensitive region of the photoelectric device 2a covers the area of the object 3, and therefore the photoelectric device 2a fully receives the reflected light, and the next photoelectric device 2b covers a small side part of the object 3, and sensitive regions of other devices 2c, 2d . . . do not cover the area of the object 3.

The outputs of the photoelectric devices 2a, 2b . . . are processed by the electronic circuit shown in FIG. 3, wherein output signals of the photoelectric devices 2a, 2b, 2c, 2d and 2e are fed to differentiating circuits 5a, 5b, 5c, 5d and 5e respectively, and through a largest level selection circuit 6, comprising diodes 6a, 6b, 6c, 6d and 6e, fed to an amplifier 8.

Figure 4A:
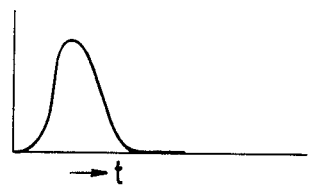
FIG. 4(A), FIG. 4(B), FIG. 4(C), FIG. 4(D), FIG. 4(E) and FIG. 4(F) are waveform diagrams for explanation of operation of the embodiment.
Figure 4B:
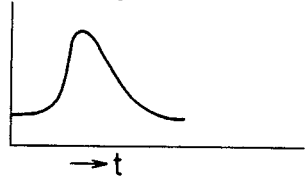
Figure 4C:
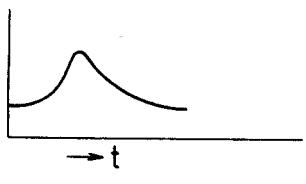
Figure 4D:
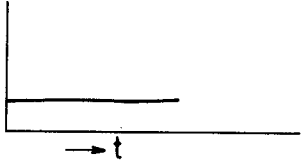
Figure 5:
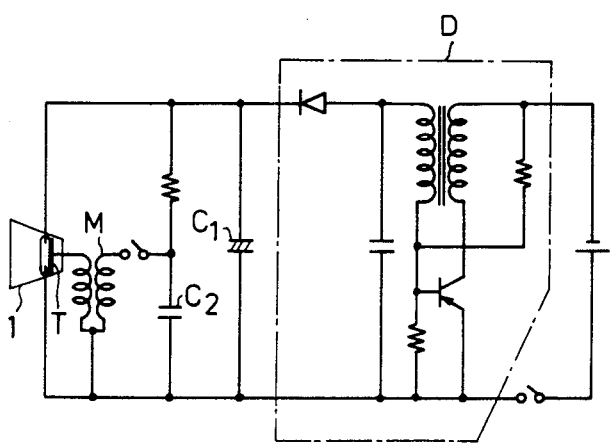
FIG. 5 is a circuit diagram of a part for producing pulsive light to be projected on the object.

The light source 1 is lit by a circuit shown in FIG. 5, wherein a DC-DC converter D charges a main capacitor $C_1$, and the charge of the main capacitor $C_1$ is discharged, when an igniting pulse is impressed on a triggering electrode T from a second capacitor $C_2$ through a pulse transformer M, thus emitting a very strong light for a very short time of several μ sec. to several tens μ sec. to the object 3 as shown by FIG. 4(A). Since the object is illuminated by sun light or artificial light of substantially constant intensity or of very low frequency as shown by FIG. 4(D), the total light on the object contains both the substantially DC part and the short pulse part as shown by FIG. 4(B). Therefore, the photoelectric device 2a, which fully receives the reflection of projected pulsive light issues the output signal corresponding to the incident light intensity shown by FIG. 4(B). However, the next photoelectric device 2b in the sensitive angle of which, only a small part of the object 3 exists, the pulsive contents is low in comparison with the DC part in its incident light as shown in FIG. 4(C). Therefore, the output signals of these photoelectric devices have waveforms similar as those of FIG. 4(B) and FIG. 4(C) respectively.

Figure 4E:
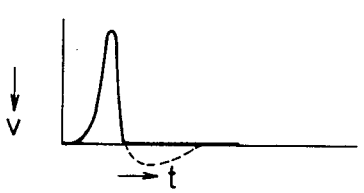
Figure 4F:
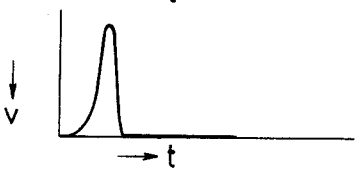

In the circuit of FIG. 3, when either one or more photoelectric devices issue output signals having pulsive content, the background noise part, i.e., the DC part or the low frequency parts due to the sun light or artificial illumination lights, are removed by passing through the differentiating circuit 5a, 5b . . . . Accordingly, only the significant pulsive content of the signals shown by FIG. 4(E) are led to the largest level selection circuit 6. Then output of the largest level selection circuit 6, shown by FIG. 4(F), is led to and amplified by the amplifier 8. In this case, since the output of the differentiating circuit 5b is lower than that of the differentiating circuit 5a impressed on a resistor 7, it can not pass the diode 6b, accordingly, only the output of the differentiating circuit 5a is led to amplifier 8. That is, only the largest output signal issued by a photoelectric device, that covers the most part of area of the object by its sensitive angle, is led to the amplifier 8. On the other hand, even if a very large matter exists behind the object 3, outputs from other photoelectric devices based on such large matter are weaker than that from the photoelectric device 2a since the distance thereto is longer than that to the genuine object 3, and therefore, the distance indication is based on the genuine object, and an output signal (i.e. distance signal) shown by FIG. 4(F) is issued to the output terminal 9. This distance signal is then fed to a function circuit 10, which comprises a predetermined number of comparators impressed with respective predetermined reference voltages from a voltage divider circuit having resistors 11, 12, 13, 14 and 15 and connected to a substantially constant voltage source +Vcc. By suitably selecting the resistances 11, 12, 13, 14 and 15, distance signals for 1 m, 1.5 m, 2 m, 3 m and 5 m are issued to the output terminals 16, 17, 18, 19 and 20, respectively. For example, the amplifier 8 is adjusted to produce an output signal of a value 1 when distance is 1 m, and then at the measurement of 5 m the output value becomes $1/5^2 = 0.04$. Therefore, by designing the voltage divider to produce an output of 0.04 of the constant voltage Vcc, the output is issued only to the output terminal 16, thereby indicating a distance of 5 m. When the distance is 3 m, the output value becomes $1/3^2 = 0.11$, and therefore the voltage divider is so designed to give the divided voltage of 0.11 of the constant voltage Vcc, then the output is issued to the comparator output terminals 16 and 17. By suitably designing the voltage divider in this way, for the distance measurement of 1 m, outputs are issued to all the terminals 16 to 20 thereby indicating the distance of 1 m.

As has been explained, one or more of the photoelectric device in the array issue output signal and the highest level selection circuit 6 selectively passes the output of the highest level to the amplifier 8, and the function circuit 10 gives an indication signal at the detection of the predetermined levels of photoelectric detection signal as the distance signal, and therefore by selecting resistances of the resistors of the voltage divider circuit, any distances can be selected as those to be indicated.

The strobo lamp, that is a gas discharge lamp utilizing emission from a positive column at arc discharging, is very suitable for the apparatus of the present invention because of the following reason. Sun light or artificial illumination light as environmental light sometimes gives brightness of several thousand lux, and on the other hand, light to be projected on the object from the light source 1 should be 1/100 to 1/10 of the above-mentioned environmental light, for the view point of good S/N ratio by avoiding saturation of the photoelectric element. Therefore, the brightness by the light source 1 should be several ten lux. Provided that maximum distance to be measured is selected 5 m, then necessary light intensity per unit solid angle becomes (several ten $lx \times 5^2 \approx$) 1000 lm. In order to project a high intensity light of 1000 lm per unit solid angle to such a wide area or in such a wide solid angle range of 0.5 steradian (which is a range of a cone with a circular section having divergence angle at the top of 45°), a very strong light source of (1000×0.5 =) 500 lm is necessary. A strobo light is very much suitable to project such a high intensity light during a short time.

Change of the illumination under the sun light is principally made by moving of the object, and the change ordinarily takes several ten m sec.. Provided that the illumination changes by 1000 lx during 10 m sec., the change rate is (1000 lx/10 m sec.=) 100 lx/m sec. On the other hand, under artificial illumination such as a fluorescent lamp, for example, when 500 lx changes at the rate of 120 Hz the change rate is (500 lx/4 m sec. =) 125 lx/m sec. To contrast these change rates of the illumination, the change rate of the light of the strobo lamp is such larger than these, for example, that a small strobo lamp of 500 lm rises up to its peak intensity after only several μ sec. to several ten μ sec., and therefore, for example 500 lm change during 10 μ sec. makes a change rate of illmination several ten thousand lx/m sec., which is several hundred times as large as those under sun light or fluorescent light illumination. Therefore, by utilizing the strobo lamp as the light source 1 and by selectively taking out the signals produced by the strobo light by utilizing differentiating circuits 5a, 5b . . . , effect of background noises caused by sun light and artificial illumination can be effectively removed, and an accurate output of the distance measuring apparatus is obtainable.

What is claimed is:

1. A distance measuring apparatus comprising:
light projecting means for projecting a flash of light which spreads as it travels from a discharge lamp which discharges by consuming a charge stored in a capacitor,
light receiving means comprising an array of light receiving devices for receiving light reflected from an object, a distance to which is to be measured, said array of light receiving devices comprising a predetermined number of light receiving devices each having a predetermined restricted directivity with their optical axes of directivities at predetermined substantially uniform angular pitches, and each outputting signals respectively representing their received reflected light, and a distance signal producing circuit which detects the one signal which is the highest output level among plural output signals output by said light receiving devices, said distance circuit comprising a differentiating circuit for differentiating said output signals of said light receiving devices to thereby produce a distance signal by comparing said detected highest output level with plural predetermined reference levels corresponding to respective various distances.

* * * * *